United States Patent
Tseng

(10) Patent No.: US 8,031,658 B2
(45) Date of Patent: Oct. 4, 2011

(54) METHOD AND APPARATUS FOR PERFORMING BUFFER STATUS REPORTING

(75) Inventor: Li-Chih Tseng, Taipei (TW)

(73) Assignee: Innovative Sonic Limited, Port Louis (MU)

(*) Notice: Subject to any disclaimer, the term of this patent is extended or adjusted under 35 U.S.C. 154(b) by 59 days.

(21) Appl. No.: 12/424,548

(22) Filed: Apr. 16, 2009

(65) Prior Publication Data
US 2009/0285104 A1 Nov. 19, 2009

Related U.S. Application Data

(60) Provisional application No. 61/054,466, filed on May 19, 2008.

(51) Int. Cl.
*H04W 4/00* (2009.01)
*H04J 3/24* (2006.01)
*H04J 3/00* (2006.01)

(52) U.S. Cl. .................. 370/328; 370/474; 370/476

(58) Field of Classification Search ............... None
See application file for complete search history.

(56) References Cited

U.S. PATENT DOCUMENTS

| | | | |
|---|---|---|---|
| 7,561,561 B2 | 7/2009 | Wu | |
| 7,706,410 B2* | 4/2010 | Chun et al. | 370/474 |
| 2004/0185855 A1 | 9/2004 | Storm | |
| 2004/0203778 A1 | 10/2004 | Kuo | |
| 2006/0281413 A1 | 12/2006 | Burbidge | |
| 2007/0195733 A1 | 8/2007 | Noh | |
| 2007/0258489 A1 | 11/2007 | Jiang | |
| 2009/0088195 A1* | 4/2009 | Rosa et al. | 455/507 |
| 2009/0163211 A1* | 6/2009 | Kitazoe et al. | 455/436 |
| 2009/0190480 A1 | 7/2009 | Sammour | |
| 2010/0111206 A1* | 5/2010 | Wu | 375/260 |
| 2010/0195614 A1* | 8/2010 | Nimbalker et al. | 370/330 |
| 2010/0238875 A1* | 9/2010 | Sung et al. | 370/329 |
| 2010/0322098 A1* | 12/2010 | Pelletier et al. | 370/252 |

FOREIGN PATENT DOCUMENTS

| | | |
|---|---|---|
| EP | 1 465 369 A1 | 10/2004 |
| EP | 1 777 857 A2 | 4/2007 |
| EP | 1 852 995 A2 | 11/2007 |
| WO | 2007147431 A1 | 12/2007 |

OTHER PUBLICATIONS

3GPP TS 25.331 V8.2.0 (pp. 305-306), Mar. 2008.
3GPP, R1-082085 3GPP TSG-Ran WG1 Meeting #53, May 2008.
3GPP, R2-08xxx, "CR00xr2 to 36331(REL-8) on Miscellaneous clarifications and corrections-v01", May 2008.
3GPP, R2-082050, CR00x rev1 to TS 36.331 v8.1.0, Mar. 2008.

(Continued)

*Primary Examiner* — Nittaya Juntima
(74) *Attorney, Agent, or Firm* — Klein, O'Neill & Singh, LLP

(57) ABSTRACT

The present invention provides a method for performing Buffer Status Reporting (BSR) in a user equipment (UE) of a wireless communication system. The method includes steps of forming a Medium Access Control (MAC) Packet Data Unit (PDU), the MAC PDU including padding bits with a bit amount larger than the size of a BSR MAC control element, triggering a padding BSR procedure, reporting a short BSR MAC control element when the padding bits of the MAC PDU cannot accommodate a long BSR MAC control element, and indicating the short BSR MAC control element triggered by the padding BSR procedure through a sub-header corresponding to the BSR MAC control element in the MAC PDU.

14 Claims, 4 Drawing Sheets

OTHER PUBLICATIONS

3GPP, R2-081121, Feb. 2008.
3GPP, R2-082400, May 2008.
3GPP, R2-08xxxx "Minutes of RAN2 #61 meeting", Feb. 2008.
3GPP TS 25.214 V8.1.0 (pp. 38 to 41), Mar. 2008.
"3GPP TS 36.321 V8.1.0, 3rd Generation Partnership Project; Technical Specification Group Radio Access Network; Evolved Universal Terrestrial Radio Access (E-UTRA) Medium Access Control (MAC) protocol specification (Release 8)", Mar. 1, 2008, XP002521730.
Nokia Corporation, Nokia Siemens Networks: "Criteria for Short and Long BSR", 3GPP TSG-RAN WG2 Meeting #60bis, R2-080015, XP050137919, Jan. 14-18, 2008, Sevilla, Spain.

* cited by examiner

METHOD AND APPARATUS FOR PERFORMING BUFFER STATUS REPORTING

CROSS REFERENCE TO RELATED APPLICATIONS

This application claims the benefit of U.S. Provisional Application No. 61/054,466, filed on May 19, 2008 and entitled "Method and Apparatus for Improving Signalling utilization", the contents of which are incorporated herein by reference.

BACKGROUND OF THE INVENTION

1. Field of the Invention

The present invention relates to a method and apparatus for performing buffer status reporting (BSR), and more particularly, to a method and apparatus for indicating a format of a BSR MAC control element by a MAC PDU sub-header corresponding to the BSR MAC control element.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, MAC provides transmission services via a plurality of logic channels. To manage uplink resources, when a user equipment (UE) performs uplink (UL) transmission, the network can divide or map logic channels of the UE into at most four groups based on priorities, types, and so on. The priorities are corresponding to values 1 to 8, and assigned by a higher layer, the radio resource control layer. Besides, the 3rd Generation Partnership Project, 3GPP, introduces a Buffer Status Reporting (BSR) procedure, which is used to provide the serving NB (or enhanced NB) with information about the amount of data in UL buffers of the UE. In the BSR procedure, the UE uses a MAC PDU (Protocol Data Unit) to carry a BSR MAC control element with information about the amount of data in the UL buffers to the network. Accordingly, the network can determine the total amount of data available across one or all logical channel groups.

In a current specification, there are three types of BSR procedures for different triggering events, a regular BSR, a periodic BSR and a padding BSR. The regular BSR is triggered when UL data arrives at the UE transmission buffer and the UL data belongs to a logical channel with higher priority than those for which data already existed in the UE transmission buffer, or is triggered when a serving cell change occurs. The periodic BSR is triggered when a periodic BSR timer expires. The padding BSR is triggered when UL resources are allocated and an amount of padding bits is equal to or greater than the size of the BSR MAC control element.

Besides, according to different requirements, the BSR MAC control elements can be categorized into two formats: short and long. A short BSR MAC control element is 1-byte long, and has 8 bits, where the former 2 bits indicate one logic channel group which buffer status is being reported, and the remaining six bits indicate the amount of buffered data available across the logic channel group. A long BSR MAC control element is 3-byte long, and utilized for reporting data amount of the UL buffers of all the logic channel groups.

On the other hand, a MAC PDU header consists of one or more sub-headers, each sub-header corresponding to either a MAC Service Data Unit (SDU), a MAC control element or padding carried by the MAC PDU. The MAC PDU sub-headers have the same order as the corresponding MAC SDUs, MAC Control elements and padding. A MAC PDU sub-header corresponding to a MAC control element generally consists of two Reserved bits, an 1-bit Extension field and a 5-bit logic channel indentify (LCID) field. In the current specification, the format of the BSR MAC control element can be identified by LCID values, e.g. "11101" and "11110" are used for indicating the short BSR MAC control element and the long BSR MAC control element, respectively. Detailed description of the MAC PDU sub-headers can be found in related protocol specifications, and not narrated herein.

For the regular and periodic BSR procedure, the format of the BSR MAC control element is determined by the UE according to whether there is more than one logic channel group with uplink buffered data in the UE when the BSR is transmitted. If there is only one logic channel group with uplink buffered data, the short BSR MAC control element is reported. Conversely, if there are more than one logic channel groups with uplink buffered data, the long BSR MAC control element is reported.

For the padding BSR procedure, the BSR control element format is determined according to the number of padding bits remaining in the MAC PDU. If the number of padding bits is equal to or larger than the size of the short BSR MAC control element but smaller than the size of the long BSR MAC control element, the short BSR MAC control element is used, for reporting data amount in the uplink buffer of a highest priority logic channel group. Conversely, if the number of padding bits is equal to or larger than the size of the long BSR MAC control element, the long BSR MAC control element is used, for reporting data amount in the uplink buffer of all the logic channel groups.

In this case, when there are more than one logic channel groups with uplink buffered data but the number of padding bits of the MAC PDU cannot accommodate the long BSR MAC control element, based on the related specifications, the UE would still report the short BSR MAC control element for increasing system scheduling efficiency. However, since the prior art does not disclose how to indicate the short BSR MAC control element transmitted by the UE is triggered by the regular and periodic BSR procedure or by the padding BSR procedure, the network is unable to determine whether there is only one logic channel group with UL buffered data in the UE. It is possible that a wrong decision, such as providing an incorrect uplink grant for the UE, may be made by the network.

SUMMARY OF THE INVENTION

It is therefore an objective of the present invention to provide a method and apparatus for performing buffer status reporting (BSR) in a user equipment of a wireless communications system.

According to the present invention, a method for performing buffer status reporting (BSR) in a user equipment (UE) of a wireless communication system is disclosed. The method includes steps of forming a Medium Access Control (MAC) Packet Data Unit (PDU), the MAC PDU including padding bits with a bit amount larger than the size of a BSR MAC control element, triggering a padding BSR procedure, reporting a short BSR MAC control element when the padding bits of the MAC PDU cannot accommodate a long BSR MAC control element, and indicating the short BSR MAC control element triggered by the padding BSR procedure through a sub-header corresponding to the BSR MAC control element in the MAC PDU.

According to the present invention, a communications device for performing buffer status reporting in a user equipment (UE) of a wireless communication system is disclosed. The communications device includes a processor for executing a program code, and a memory, coupled to the processor, for storing the program code. The process includes steps of forming a Medium Access Control (MAC) Packet Data Unit (PDU), the MAC PDU including padding bits with a bit amount larger than the size of a BSR MAC control element, triggering a padding BSR procedure, reporting a short BSR MAC control element when the padding bits of the MAC PDU cannot accommodate a long BSR MAC control element, and indicating the short BSR MAC control element triggered by the padding BSR procedure through a sub-header corresponding to the BSR MAC control element in the MAC PDU.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
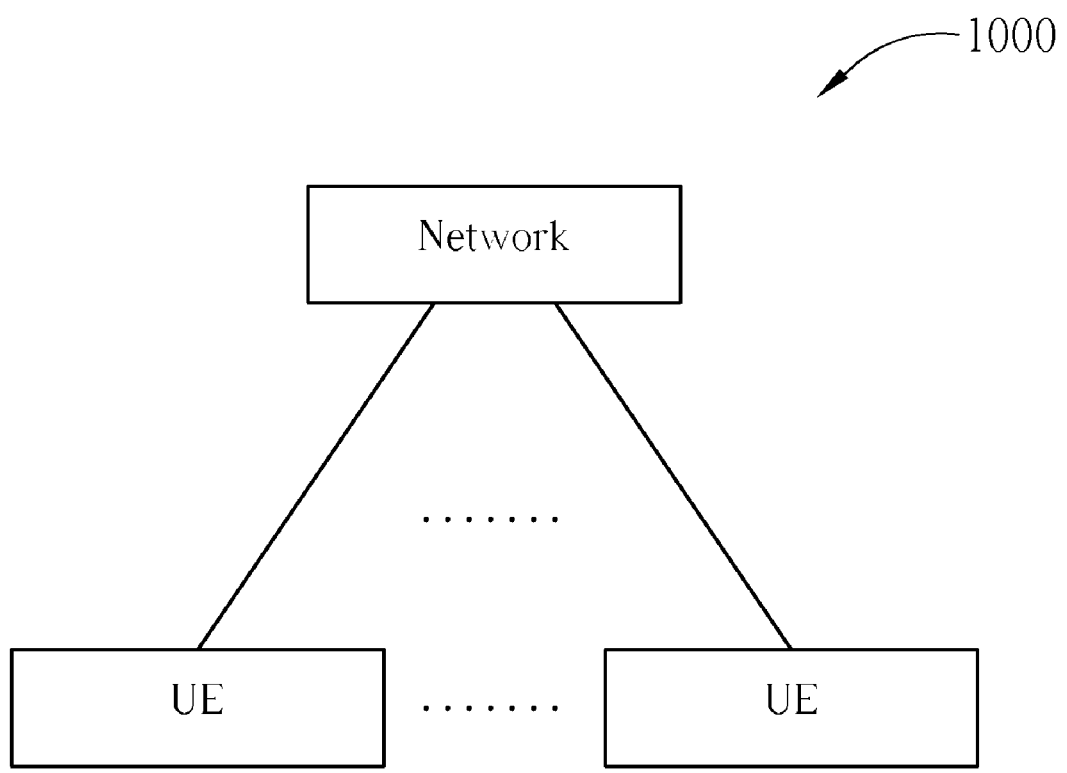
FIG. 1 is a schematic diagram of a wireless communications system.

Please refer to FIG. 1, which illustrates a schematic diagram of a wireless communication system 1000. The wireless communication system 1000 is preferably an LTE (long-term evolution) system, and is briefly composed of a network and a plurality of UEs. In FIG. 1, the network and the UEs are simply utilized for illustrating the structure of the wireless communication system 1000. Practically, the network may comprise a plurality of base stations (Node Bs), radio network controllers and so on according to actual demands, and the UEs can be devices such as mobile phones, computer systems, etc.

Figure 2:
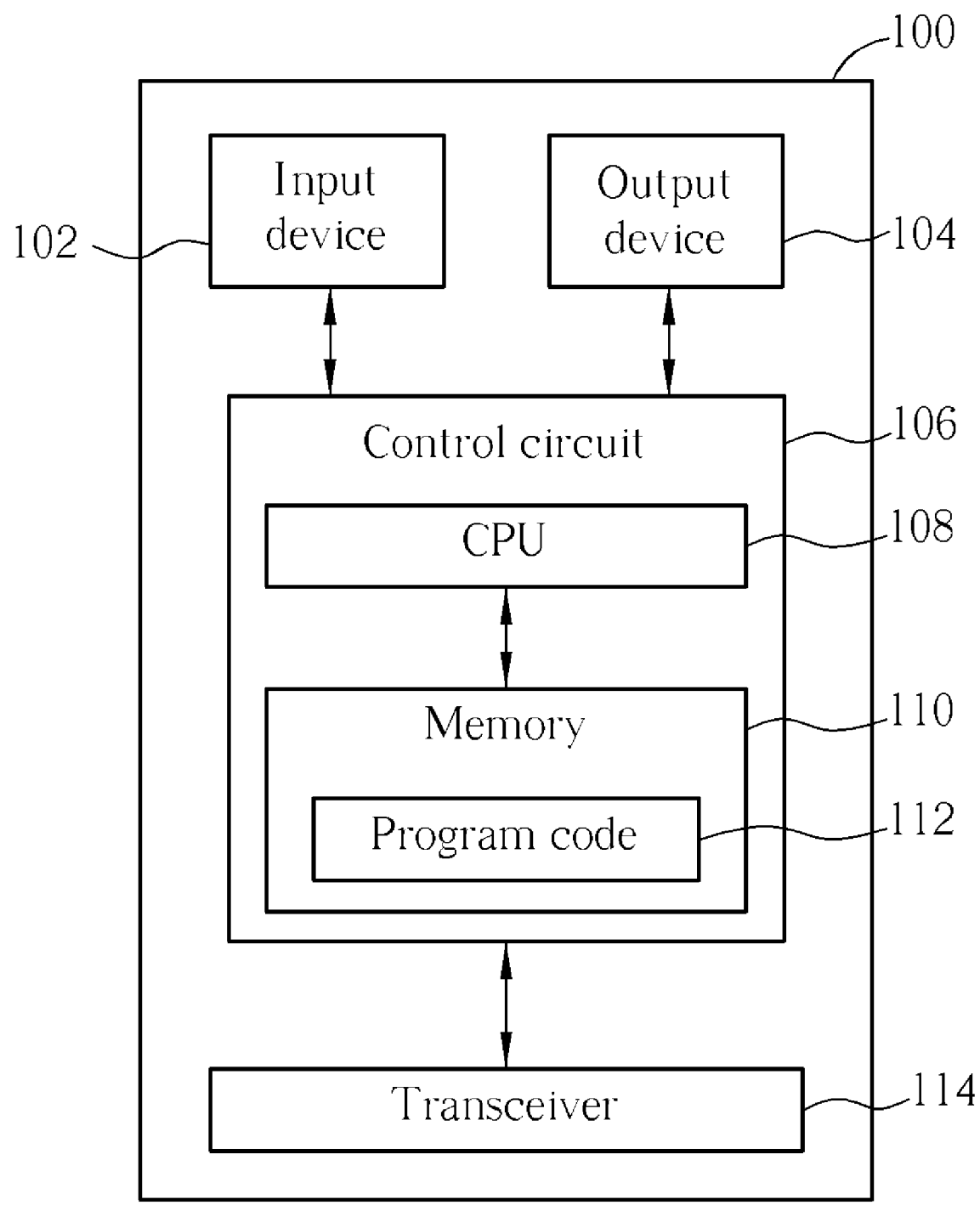
FIG. 2 is a function block diagram of a wireless communications device.

Please refer to FIG. 2, which is a functional block diagram of a communication device 100 in a wireless communication system. For the sake of brevity, FIG. 2 only shows an input device 102, an output device 104, a control circuit 106, a central processing unit (CPU) 108, a memory 110, a program code 112, and a transceiver 114 of the communication device 100. In the communication device 100, the control circuit 106 executes the program code 112 in the memory 110 through the CPU 108, thereby controlling an operation of the communication device 100. The communication device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communication protocol framework, the transceiver 114 can be seen as a portion of Layer 1, and the control circuit 106 can be utilized to realize functions of Layer 2 and Layer 3.

Figure 3:
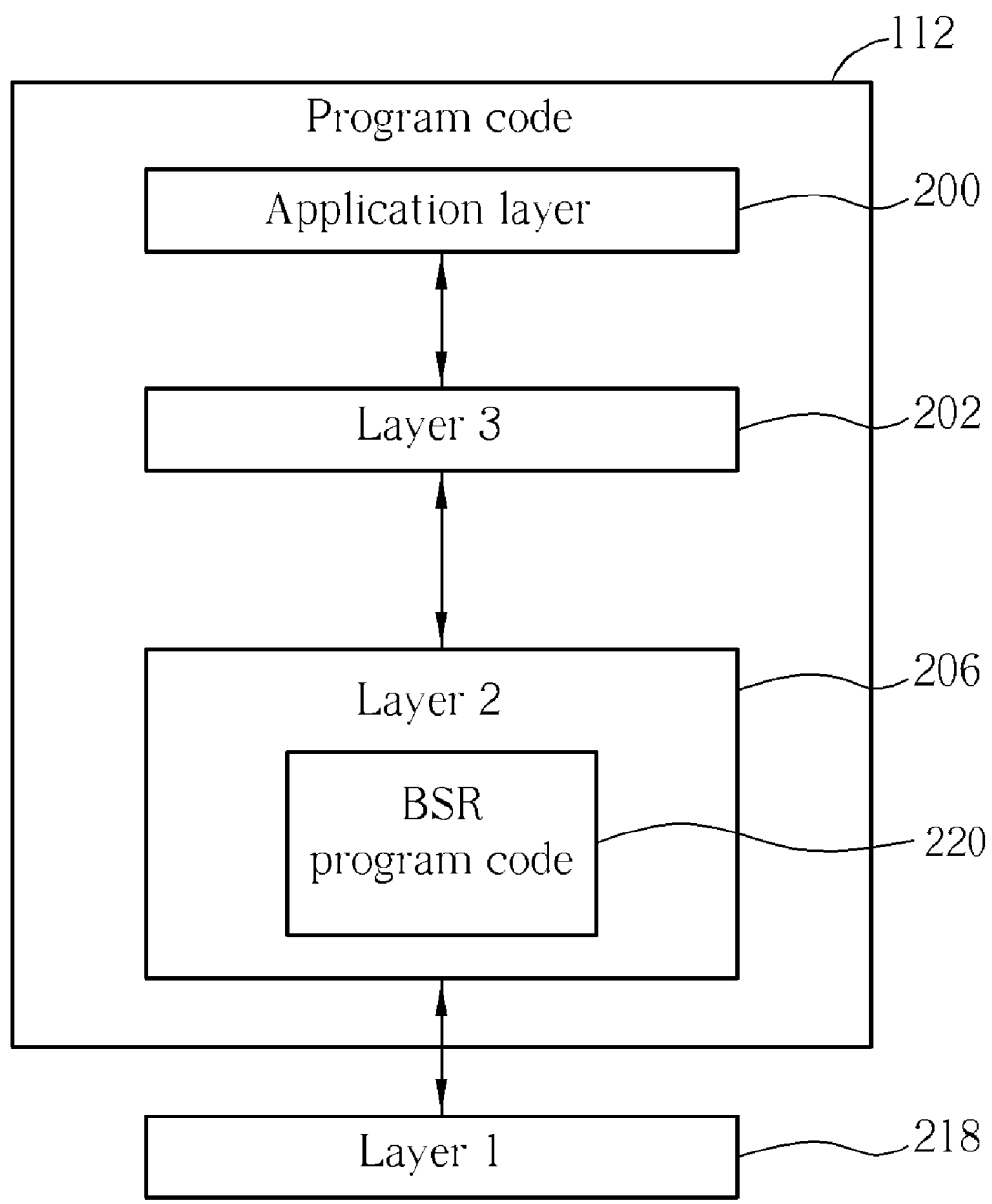
FIG. 3 is a diagram of program code of FIG. 2.

Please continue to refer to FIG. 3, which is a diagram of the program code 112 shown in FIG. 2. The program code 112 includes an application layer 200, a Layer 3 202, and a Layer 2 206, and is coupled to a Layer 1 218. The Layer 3 202 performs radio resource control. The Layer 2 206 comprises an RLC layer and a MAC layer, and performs link control. The Layer 1 218 performs physical connections.

In LTE, the MAC layer of the Layer 2 206 can perform a Buffer Status Reporting (BSR) procedure to report information about the amount of data in the UL buffers to the network via a BSR MAC control element. Accordingly, the network can determine the total amount of data available across one or all logical channel groups. In such a situation, the embodiment of the present invention provides a BSR program code 220 to indicate a short BSR MAC control element is triggered by a padding BSR procedure or by a regular and periodic BSR procedure, for prevent the network from being confused.

Figure 4:
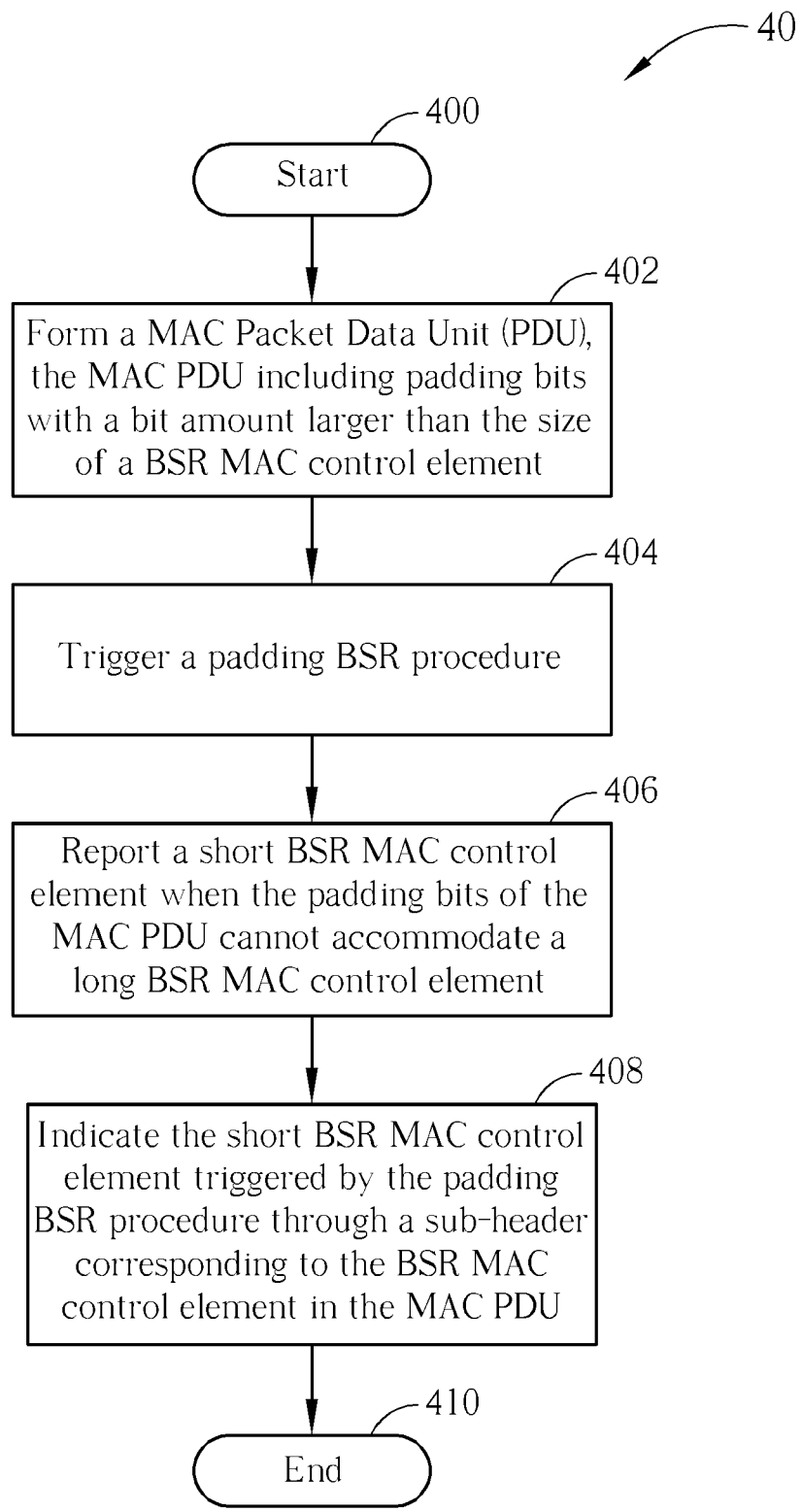
FIG. 4 is a flowchart of a process according to an embodiment of the present invention.

Please refer to FIG. 4, which illustrates a schematic diagram of a process 40. The process 40 is utilized for performing BSR in a UE of the wireless communication system 1000 to decide a BSR control element format. The process 40 comprises the following steps:

Step 400: Start.

Step 402: Form a MAC Packet Data Unit (PDU), the MAC PDU including padding bits with a bit amount larger than the size of a BSR MAC control element.

Step 404: Trigger a padding BSR procedure.

Step 406: Report a short BSR MAC control element when the padding bits of the MAC PDU cannot accommodate a long BSR MAC control element.

Step 408: Indicate the short BSR MAC control element triggered by the padding BSR procedure through a sub-header corresponding to the BSR MAC control element in the MAC PDU.

Step 410: End.

According to the process 40, when the MAC PDU is formed by the UE, if the number of the padding bits of the MAC PDU is larger than the size of the BSR MAC control element, the padding BSR procedure is triggered. If the padding bits of the MAC PDU cannot accommodate a long BSR MAC control element, the UE shall report a short BSR MAC control element, and indicate the network that the short BSR MAC control element is generated by the padding BSR procedure through a sub-header corresponding to the BSR MAC control element in the MAC PDU.

In such a situation, the short BSR MAC control element indicates the amount of data in an uplink buffer of a highest priority logic channel group of the UE. Besides, the short BSR MAC control element is 1-byte long, while the long-format BSR control element is 3-byte long.

Therefore, in the embodiment of the present invention, the MAC PDU sub-header corresponding to the BSR MAC control element is utilized to indicate the network that the short BSR MAC control element transmitted by the UE is generated by the padding BSR procedure or by the regular and periodic BSR procedure, so as to prevent the network from being confused due to incapable of determining whether there is only one logic channel group with UL buffered data in the UE.

As described in the prior art, a MAC PDU sub-header corresponding to a MAC control element generally consists of two Reserved bits, an 1-bit Extension field and a 5-bit logic channel indentify (LCID) field. Thus, the embodiment of the present invention can utilize the two Reserved bits of the sub-header to indicate the short BSR MAC control element is generated either by the padding BSR procedure or by the regular and periodic BSR procedure, e.g. the two Reserved bits of "01" and "10" can be used to indicate the padding BSR procedure and the regular and periodic BSR procedure, respectively Furthermore, the long and short BSR MAC control element can be identified by specific LCID values. Thus, when a short BSR MAC control element with the two Reserved bits as "01" is received by the network, which indicates the short BSR MAC control element transmitted by the UE is triggered by the padding BSR procedure, the network can then determine that there may exist more than one logic channel having uplink buffered data in the UE. Conversely, when a short BSR MAC control element with the two Reserved bits as "10" is received by the network, which indicates the short BSR MAC control element transmitted by the UE is triggered by the regular and periodic BSR procedure, the network can then determine that there is only one logic channel with uplink buffered data in the UE.

Certainly, in another embodiment of the present invention, the LCID field can also be used for indicating the short BSR MAC control element triggered by the padding BSR procedure. In such a situation, the embodiment of the present invention can utilize another LCID value to indicate the short BSR MAC control element triggered by the padding BSR, while the short and long BSR MAC control element triggered by the regular and periodic BSR procedure are identified by values of "11101" and "11110", respectively. Such variation also belongs to the scope of the present invention.

In summary, the embodiment of the present invention utilizes the MAC PDU sub-header corresponding to the BSR MAC control element to indicate the network that the short BSR MAC control element transmitted by the UE is triggered either by the padding BSR procedure or by the regular and periodic BSR procedure, so as to prevent the network from being confused due to incapable of determining whether there is only one logic channel group with UL buffered data in the UE.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing buffer status reporting (BSR) in a user equipment (UE) of a wireless communication system, the method comprising:
    forming a Medium Access Control (MAC) Packet Data Unit (PDU) the MAC PDU comprising padding bits with a bit number larger than the size of a BSR MAC control element; and
    triggering a BSR procedure;
    reporting a short BSR MAC control element when the padding bits of the MAC PDU cannot accommodate a long BSR MAC control element; and
    indicating through a sub-header corresponding to the BSR MAC control element in the MAC PDU if the short BSR MAC control element is triggered by a padding BSR procedure or a regular and periodic BSR procedure.

2. The method of claim 1, wherein the short BSR MAC control element indicates the amount of data in an uplink buffer of a highest priority logic channel group of the UE.

3. The method of claim 1, wherein the short BSR MAC control element is 1-byte long while the long BSR MAC control element is 3-byte long.

4. The method of claim 1, wherein the sub-header comprises two Reserved bits, an 1-bit Extension field and a 5-bit logic channel identity (LCID) field.

5. The method of claim 4, wherein indicating through the sub-header corresponding to the BSR MAC control element in the MAC PDU comprises:
    indicating the short BSR MAC control element triggered by the padding BSR procedure through the two Reserved bits of the sub-header.

6. The method of claim 1, wherein indicating through the sub-header corresponding to the BSR MAC control element in the MAC PDU comprises:
    indicating the short BSR MAC control element triggered by the padding BSR procedure through the LCID field of the sub-header.

7. The method of claim 1, wherein more than one logic channel group of the UE has uplink buffered data.

8. A communication device for performing a buffer status reporting in a user equipment (UE) for a wireless communication system, the communication device comprising:
    a processor for executing a program code; and
    a memory coupled to the processor for storing the program code;
    wherein the program code comprises:
        forming a Medium Access Control (MAC) Packet Data Unit (PDU) the MAC PDU comprising padding bits with a bit number larger than the size of a BSR MAC control element; and
        triggering a BSR procedure;
        reporting a short BSR MAC control element when the padding bits of the MAC PDU cannot accommodate a long BSR MAC control element; and
        indicating through a sub-header corresponding to the BSR MAC control element in the MAC PDU if the short BSR MAC control element is triggered by a padding BSR procedure or a regular and periodic BSR procedure.

9. The communication device of claim 8, wherein the short BSR MAC control element indicates the amount of data in an uplink buffer of a highest priority logic channel group of the UE.

10. The communication device of claim 8, wherein the short BSR MAC control element is 1-byte long while the long BSR MAC control element is 3-byte long.

11. The communication device of claim 8, wherein the sub-header comprises two Reserved bits, an 1-bit Extension field and a 5-bit logic channel identity (LCID) field.

12. The communication device of claim 11, wherein indicating through the sub-header corresponding to the BSR MAC control element in the MAC PDU comprises:
    indicating the short BSR MAC control element triggered by the padding BSR procedure through the two Reserved bits of the sub-header.

13. The communication device of claim 8, wherein indicating through the sub-header corresponding to the BSR MAC control element in the MAC PDU comprises:
    indicating the short BSR MAC control element triggered by the padding BSR procedure through the LCID field of the sub-header.

14. The communication device of claim 8, wherein more than one logic channel group of the UE has uplink buffered data.

* * * * *